United States Patent

MacArthur et al.

Patent Number: 5,281,824
Date of Patent: Jan. 25, 1994

[54] RADON DETECTION

[75] Inventors: Duncan W. MacArthur, Los Alamos; Krag S. Allander, Ojo Caliente; John A. Bounds, Los Alamos, all of N. Mex.

[73] Assignee: The United States Department of Energy, Washington, D.C.

[21] Appl. No.: 864,746

[22] Filed: Apr. 7, 1992

[51] Int. Cl.$^5$ .............................. H01J 47/02
[52] U.S. Cl. ........................ 250/380; 250/379
[58] Field of Search .............. 250/380, 379, 384

[56] References Cited

U.S. PATENT DOCUMENTS 3,084,255  4/1963  Brinkerhoff et al. ............ 250/380
5,184,019  2/1993  MacArthur et al. ............. 250/380

*Primary Examiner*—Constantine Hannaher
*Attorney, Agent, or Firm*—Milton D. Wyrick; Paul D. Gaetjens; William R. Moser

[57] ABSTRACT

A detector for atmospheric radon using a long range alpha detector as its sensing element. An electrostatic filter removes ions from ambient air, while allowing radon atoms to pass into a decay cavity. Here, radon atoms are allowed to decay, creating air ions. These air ions are drawn by a fan through a second electrostatic filter which can be activated or deactivated, and into the long range alpha detector. With the second electrostatic filter activated, no air ions are allowed to pass, and the signal output from the long range alpha detector consists of only the electronic background. With the second electrostatic filter deactivated, air ions and cosmic rays will be detected. The cosmic ray contribution can be minimized by shielding.

9 Claims, 2 Drawing Sheets

RADON DETECTION

The present invention generally relates to the detection of radiation and, more specifically, to the detection of radon. The invention is a result of a contract with the Department of Energy (Contract No. W-7405-ENG-36).

BACKGROUND OF THE INVENTION

It has been found that, on average, radon constitutes more than half of the normal background radioactivity in the environment. Apparently, radon-222, produced by natural radium in the ground, is responsible. When radon enters a house, either through small fissures, or in well water, it can remain in the air if not ventilated. In such a case, the radon decays to radioactive products that can be absorbed in the lungs and can lead, over a long period of exposure, to lung cancer. It has been estimated that from 5,000 to 20,000 lung cancer deaths annually may be attributed to radon. The U.S. Environmental Protection Agency recommends remedial action if radon levels in homes exceed 4 trillionths of a curie, or 4 picocuries, of radon per liter of air. Although initial discoveries pointed to particular areas susceptible to radon pollution, it is now known that high concentrations exist in many parts of the United States, as well as in a number of European countries.

The recent public awareness concerning the existence of radon gas has brought about a demand for sensitive and accurate detection instruments. At the present, there are numerous commercial offerings of devices intended to detect radon, the devices having varying degrees of effectiveness. All of these devices suffer from one or more of the following problems: (1) lack of sensitivity, (2) slow response time, and (3) high cost.

The present invention provides a radon detection instrument which solves these problems. It is based on technology which is contained in certain U.S. Patents which disclose various devices for the long range detection of alpha particles. The first patent is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The principle underlying each of these co-pending applications is that alpha particles, although themselves of very short range, create air ions which have a longer range and can be detected with the apparatus disclosed. The present invention modifies this apparatus to provide for reliable detection of radon.

It is therefore an object of the present invention to provide apparatus that can detect radon gas.

It is a further object of the present invention to provide a radon detector which is very sensitive.

It is a still further object of the present invention to provide a radon detector which has a short response time.

It is a feature of the present invention that it can be produced at low cost.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a radon detector using a long range alpha detector, having an input port and an output port, as its detecting element comprises first electrostatic filter means connected to the input port of the long range alpha detector for removing ions from air entering the long range alpha detector when activated. Switch means are connected to the first electrostatic filter means for activating and deactivating the first electrostatic filter means. Decay cavity means having an inlet and an outlet with its output are connected to the first electrostatic filter means for allowing radon atoms to decay in said decay cavity means. Second electrostatic filter means are connected to the inlet of the decay cavity means for removing ions from ambient air drawn through the second electrostatic filter means. Fan means are attached to the output port of the long range alpha detector for drawing air through the second electrostatic filter means, the decay cavity means, the electrostatic filter means, and the long range alpha detector.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
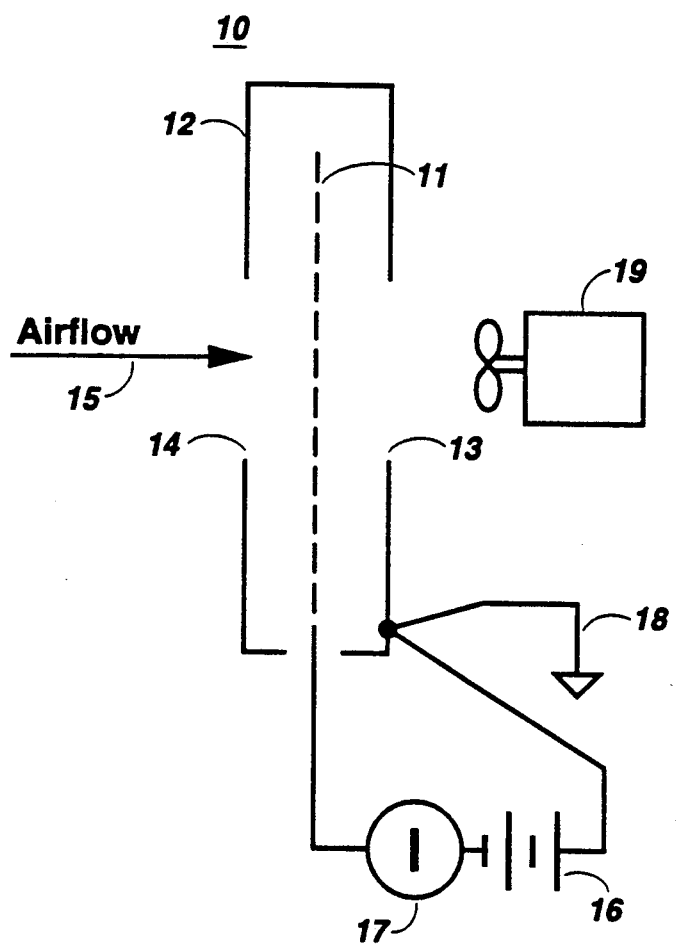
FIG. 1 is a schematical cross-sectional view of the long range alpha detector portion of the present invention.

The present invention reliably and in a short time detects the presence of radon gas. It accomplishes this using long range alpha particle detection technology. A schematical cross-sectional view of a typical long range alpha detector 10 is illustrated in FIG. 1.

Long range alpha detector 10 comprises, in this embodiment, single grid 11 insulatively mounted inside grounded enclosure 12, which defines openings 13, 14 for allowing airflow 15 to flow across grid 11, drawn by fan 19. Single grid 11, in this embodiment, acts as both a signal grid and a voltage grid. Airflow 15 may contain both positive or negative air ions (not shown) created by collisions with alpha particles or other radioactive decay products. Voltage source 16 is connected between grounded enclosure 12 and single grid 11 through current meter 17. Signal ground 18 is also connected to grounded enclosure 12.

As is easily understood from FIG. 1, single grid 11 has both voltage source 16 and current meter 17, which detects the additional current flow caused by the air ions, connected to it, making it at the same time a signal grid and a voltage grid. Current meter 17 may take many forms, but may conveniently be an electrometer, such as a Keithley 617 electrometer.

With voltage source 16 connected, an electric field exists between single grid 11 and grounded enclosure 12. This field sweeps ions of one polarity onto single grid 1 while repelling ions of the opposite polarity. Of course, in this embodiment, a positive voltage source 16 will result in collection of negatively charged ions.

Although the embodiment of FIG. 1 is extremely efficient in detecting ions created by radiation, it could be more efficient if both polarities of ions could be collected. To accomplish this, two grids, a signal grid and a voltage grid (not shown) can be insulatively mounted inside grounded enclosure 12. In this situation, voltage source 16 is connected between the voltage grid and the grounded enclosure 12 through current meter 17. An additional current meter (not shown) would be connected between the signal grid and grounded enclosure 12. Again, fan 19 draws airflow 15 across the signal grid and the voltage grid.

In this case, assuming a positive polarity of voltage source 16 connected to the voltage grid, positive air ions will be attracted to the signal grid, and the positive ion current registered on current meter 17. In the same manner, negative air ions will be attracted to voltage grid, and the negative ion current registered on the additional current meter. Electrical adding of the current on current meter 17 with the current on the additional current meter will result in a signal approximately twice as large as with the single grid embodiment of FIG. 1. This is because the probability of a negative air ion being created by collision with a radioactive particle is equal to the probability that a positive ion will be created.

Figure 2:
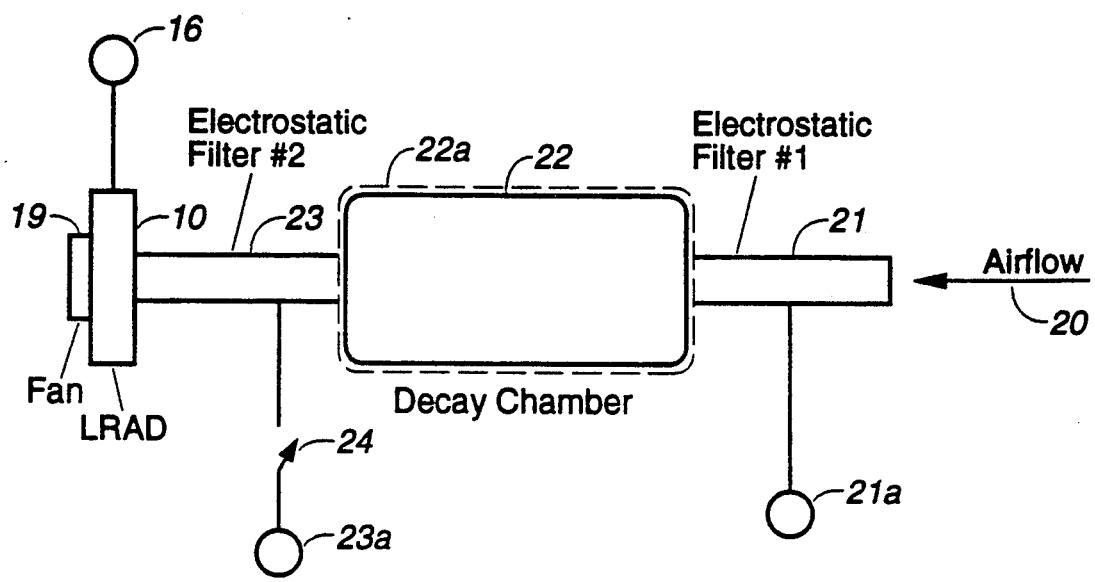
FIG. 2 is a schematic drawing of the components of the present invention for the detection of radon.

The apparatus of the present invention is illustrated schematically in FIG. 2 where airflow 20 is drawn into electrostatic filter 21 by fan 19 at the opposite end. Electrostatic filter 21 is powered by voltage source 21a. Electrostatic filter 21 removes any preexisting ions and dust particles from airflow 20 prior to airflow 20 entering decay chamber 22. In particular, electrostatic filter 21 will not remove radon atoms from airflow 20.

Filtered airflow 20 then enters decay chamber 22, where any radon atoms will be allowed to decay, creating air ion pairs which will be detected inside long range alpha detector 10. Any signal lost due to radon atoms being drawn out of decay chamber 22 before they have decayed is compensated for by new radon atoms which enter chamber 22 due to the action of fan 19. It is important that the speed of fan 19 be sufficient to exchange the air in decay chamber 22 before the collision created ions have time to recombine, so that all decays will be measured by long range alpha detector 10.

Ions created inside decay chamber 22 are drawn through electrostatic filter 23 and, when voltage source 23a is disconnected by switch 24, into long range alpha detector 10. Here, the ion signal will be measured directly. In the absence of another source of alpha radiation, this ion signal derives from three processes: (1) atmospheric radon decays that create the signal desired for this invention; (2) cosmic-ray interactions in decay chamber 22 that also created air ion pairs; and (3) ions generated in long range alpha detector 10 itself by the voltage applied by voltage source 16.

When switch 24 is closed, all ion signals generated in decay chamber 22 will be removed by electrostatic filter 23. This will leave the intrinsic long range alpha detector 10 signal. By turning electrostatic filter 23 on and off with switch 24, the true ion decay signal will be separated from the intrinsic background of detector 10.

In some embodiments, electrostatic filter 21 could be omitted.

The present invention distinguishes the normal electronic background from the decay ion signal, comprised of cosmic rays and radon decay, through use of electrostatic filter 23. However, it may prove advisable to shield decay chamber 22 with shielding 22a (shown as a dashed line) to remove the cosmic ray contribution. This can be done using at least four common techniques. The first, passive shielding, such as a lead shield, will substantially reduce any cosmic ray background. Second, active shielding, that is a second detector to register the presence of cosmic rays, is a technique often used to control the effects of cosmic rays in particle physics experiments. Third, a second long range alpha detector 10 could be employed with a source of compressed or relatively pure air, so that it would detect cosmic events, but, because of its pure air supply, would not detect radon. And fourth, the same long range alpha detector 10 could be used to take a "clean" background measurement immediately before the "radon" measurement.

Passive shielding is heavy and bulky, but is relatively inexpensive. It could be appropriate in small radon detectors for mass distribution.

As applied to the present case, active shielding would utilize a second detector (not shown) located above long range alpha detector 10 that would turn off long range alpha detector 10 during a cosmic ray event. The major difficulty with an active shield is that the response time of the shield detector must roughly match the response time of long range alpha detector 10. Most conventional shield detectors are pulse devices characterized by a response time of $\leq 1$ ms, in contrast with long range alpha detector 10 having a response time of several seconds. The active shield is potentially lighter and smaller than passive shielding, but requires significantly more development, and would be more expensive.

A second long range alpha detector 10 would achieve matched detector and shield response times, and provides good operation. However, the method requires a second detector 10 and associated electronics, as well as a supply of pure air. For these reasons, this method might best be used in large, precise, stationary radon detectors.

Finally, use of the same detector 10 for background and radon measurement depends on the relative uniformity of the cosmic ray background. No additional hardware is required, but relies on the experience of the operator to choose a "good" background environment. Unlike the previous three methods, this technique requires a trained operator.

As the present invention intrinsically operates as a flowing air device, it has numerous significant advantages as a radon detector. One of these advantages is that data acquisition is continuous, rather than requiring a separate collection time, because the air in decay cavity 22 is constantly being exchanged. Another is that large decay cavities 22 can be employed with the present invention, limited in size only by the air-exchange rate of fan 19. A large decay cavity 22 provides a larger radon signal, but also provides a larger (unshielded) cosmic-ray signal. Still another is that the present invention can be used with tubing to sample for radon hotspots or entry points by drawing air from a specific location into detector 10. Finally, the sensitivity and fast response of the present invention facilitates its application in numerous specific locations.

Electrical power for components of the invention may provided by sources that are convenient for the application. Portable applications require battery power, which will provide the least noisy signal and, therefore, the highest sensitivity. The high voltage required by long range alpha detector 10, voltage source 16, is only 300V, and is supplied by a battery even if voltage sources, 21a, and 23a are powered with alternating current. The extremely low current demands imposed on all three voltage sources indicate that the batteries' operational lifetimes will approximate their "shelflives."

Figure 3:
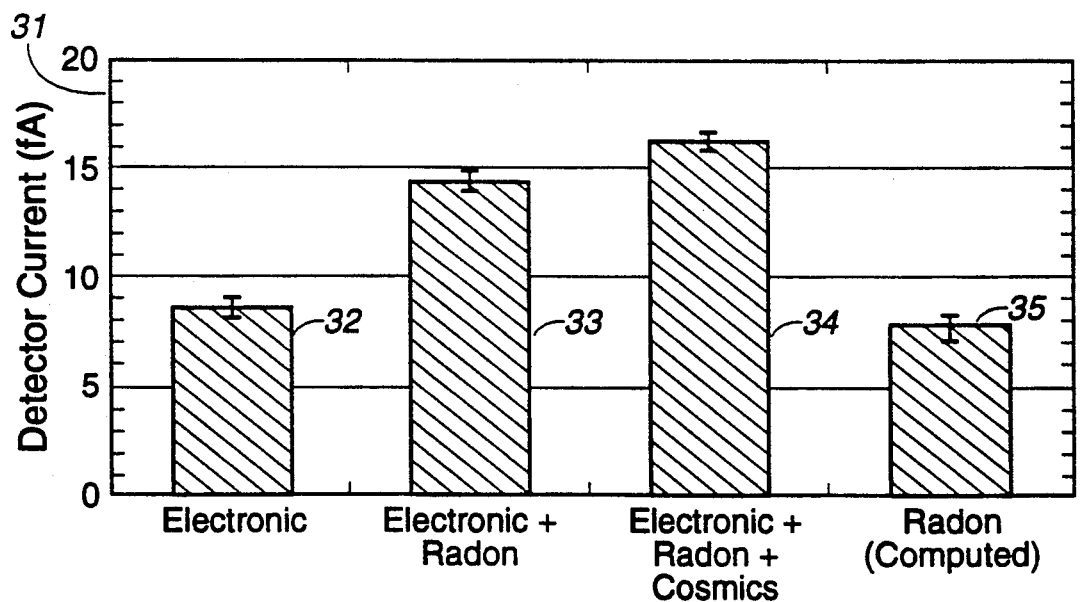
FIG. 3 is a bar graph representing outputs of the radon detector according to the present invention.

A bar graph is illustrated in FIG. 3, indication results achieved using the present invention. Vertical axis 31 is the current in long range alpha detector 10 in femtoamperes. As shown, electronic signal 32 is above 8 fA, electronic plus radon signal 33 is above 14 fA, and electronic plus radon plus cosmic rays signal 34 is above 16 fA. From this information, radon signal 35 is computed by simple subtraction at approximately 8 fA. These results illustrate the sensitivity of the present invention to normal background radon levels.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radon detector using a long range alpha detector, having an input port and an output port, as its detecting element comprising:

first electrostatic filter means connected to said input port of said long range alpha detector for removing ions from air entering said long range alpha detector when activated;

switch means connected to said first electrostatic filter means for activating and deactivating said first electrostatic filter means;

decay cavity means having an inlet and an outlet with its output connected to said electrostatic filter means for allowing radon atoms to decay;

second electrostatic filter means connected to said inlet of said decay cavity means for removing ions from ambient air drawn through said second electrostatic filter means;

fan means attached to said output port of said long range alpha detector for drawing air through said second electrostatic filter means, through said decay cavity means, through said first electrostatic filter means, and through said long range alpha detector.

2. The radon detector as described in claim 1, further comprising voltage sources connected to said long range alpha detector, to said first electrostatic filter means and to said second electrostatic filter means.

3. The radon detector as described in claim 2, wherein said voltage sources comprise batteries.

4. The radon detector as described in claim 1, further comprising shielding of the radon detector to reduce cosmic ray interactions in said decay cavity means.

5. The radon detector as described in claim 4, wherein said shielding comprises lead placed about said decay cavity means.

6. The radon detector as described in claim 4, wherein said shielding comprises active shielding.

7. The radon detector as described in claim 6, wherein said active shielding comprises a second long range alpha detector having compressed air or pure air drawn into its input port.

8. The radon detector as described in claim 6, wherein said active shielding comprises taking a cosmic ray reading immediately prior to admitting air ions, with the same long range alpha detector.

9. A radon detector using a long range alpha detector, having an input port and an output port, as its detecting element comprising:

first electrostatic filter means connected to said input port of said long range alpha detector for removing ions from air entering said long range alpha detector when activated;

switch means connected to said first electrostatic filter means for activating and deactivating said first electrostatic filter means;

decay cavity means having an inlet and an outlet with its output connected to said electrostatic filter means for allowing radon atoms to decay;

fan means attached to said output port of said long range alpha detector for drawing air through said second electrostatic filter means, through said decay cavity means, through said first electrostatic filter means, and through said long range alpha detector.

* * * * *